April 24, 1956     I. T. RUTH     2,743,111
SPREADER BOX ATTACHMENT FOR TAIL GATES, INCLUDING
RELATIVELY ADJUSTABLE GATE MEMBERS Filed Oct. 20, 1952     2 Sheets-Sheet 1

Ira Thomas Ruth
INVENTOR.

BY *Clarence A. O'Brien*
*and Harvey B. Jacobson*
Attorneys

April 24, 1956  I. T. RUTH  2,743,111
SPREADER BOX ATTACHMENT FOR TAIL GATES, INCLUDING
RELATIVELY ADJUSTABLE GATE MEMBERS
Filed Oct. 20, 1952  2 Sheets-Sheet 2
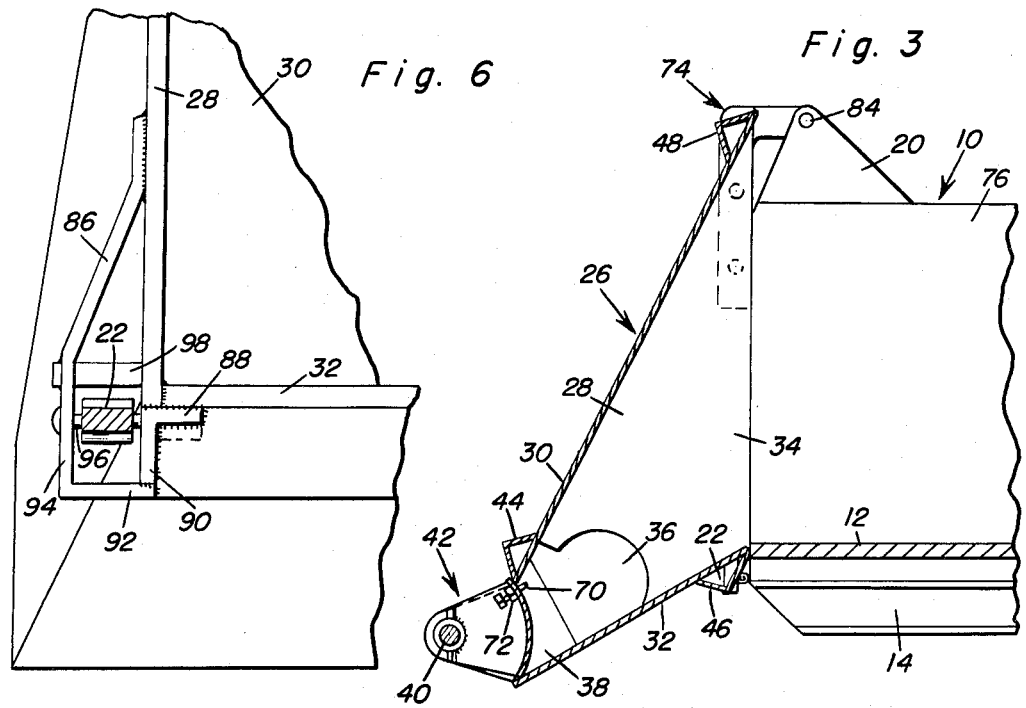
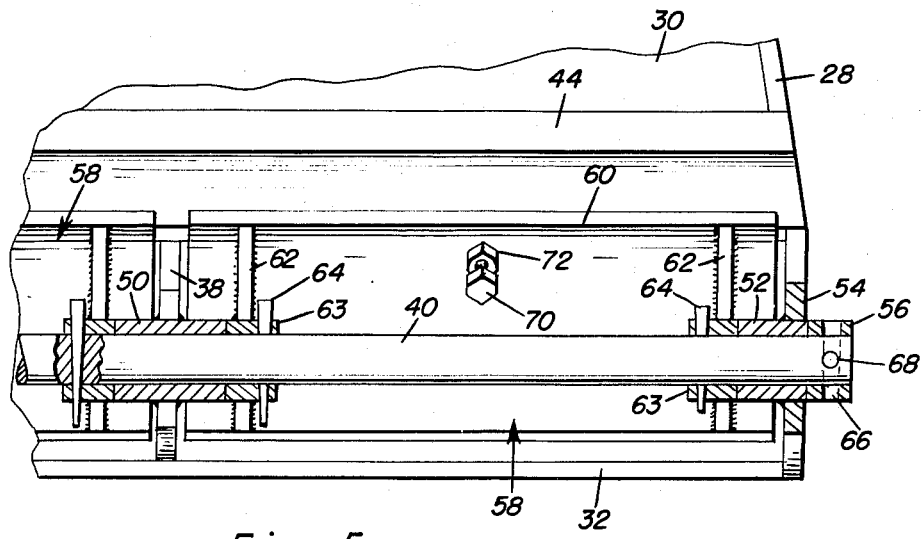
Ira Thomas Ruth
INVENTOR.
BY *Clarence A. O'Brien*
*and Harvey B. Jacobson*
Attorneys

United States Patent Office 2,743,111
Patented Apr. 24, 1956

2,743,111

SPREADER BOX ATTACHMENT FOR TAIL GATES, INCLUDING RELATIVELY ADJUSTABLE GATE MEMBERS

Ira Thomas Ruth, Georgetown, Ky., assignor to Ruth Brothers, Georgetown, Ky., a partnership Application October 20, 1952, Serial No. 315,658

3 Claims. (Cl. 275—2)

This invention relates in general to attachments for trucks, and more particularly to an attachment for dump trucks to facilitate the spreading of materials therewith.

The primary object of this invention is to provide an improved spreader box tail gate assembly adapted to be removably secured to existing dump bodies to permit the varying of the width of material being spread by dumping from said dump body.

Another object of this invention is to provide a spreader box tail gate assembly which may be easily and quickly attached to conventional truck dump bodies utilizing the fittings normally required for the mounting of a tail gate.

Another object of this invention is to provide an improved spreader box tail gate assembly which will permit the spreading of materials over a surface while a truck with which it is associated is backing up.

A further object of this invention is to provide an improved spreader box tail gate assembly, said spreader box being provided with mounting means which are adjustable so as to permit the attachment of the assembly to truck dump bodies of various heights.

A still further object of this invention is to provide an improved spreader box assembly adapted to be mounted as a tail gate at the rear of a dump body, said spreader box assembly including a plurality of gate sections forming a gate for controlling the dumping of materials through the spreader box, said gate sections being selectively rendered inoperative.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this specification, and in which:

Figure 3 is a fragmentary vertical sectional view taken substantially upon the plane indicated by the section line 3—3 of Figure 2 and shows the general cross-section of the spreader box attachment and the outline of a gate at the lower end thereof for controlling the dumping of material through a discharge opening thereof;

Figure 1:
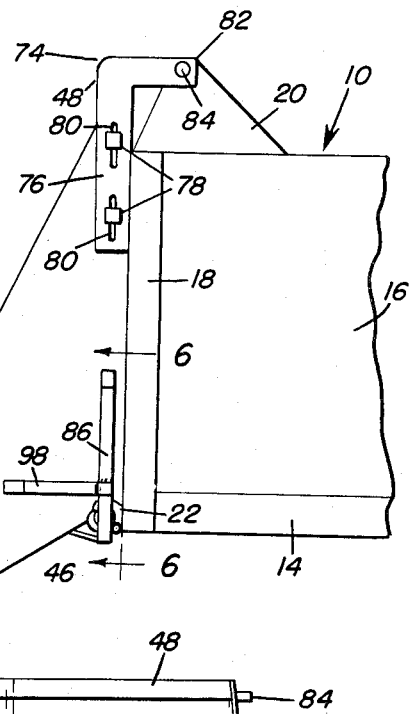
Figure 1 is a side elevational view of a rear portion of a dump truck body and shows the spreader box attachment, which is the subject of this invention, secured thereon in lieu of its tail gate.

Figure 5 is a transverse vertical sectional view taken substantially upon the plane indicated by the section line 5—5 of Figure 1 and shows the manner in which a gate section is mounted on an actuating shaft of the gate; and, Figure 6 is a fragmentary vertical sectional view taken substantially upon the plane indicated by the section line 6—6 of Figure 1 and shows the manner in which a latch-engaging spool is mounted at the forward end of the spreader box attachment for securing the same to the bottom part of the rear portion of the dump truck body.

Similar characters of reference designate similar or identical elements and portions throughout the specification and throughout the different views of the drawings.

Referring now to the drawings in detail, it will be seen that there is illustrated in Figure 1 a rear portion of a dump truck body which is referred to in general by the reference numeral 10. The dump truck body 10 includes a bottom 12, as is best illustrated in Figure 3, which terminates in outwardly projecting flange portions 14. Extending upwardly from the sides of the bottom 12 are side walls 16 which terminate at their rear ends in corner posts 18. The dump truck body 10 also includes hinge plates 20 carried by and extending upwardly from the top edges of the side walls 16 at the rear ends thereof. The hinge plates 20 are adapted to cooperate with hinge elements of a tail gate (not shown) for supporting the same for pivotal movement. Secured to the rear end of the bottom 12 are spaced latch elements 22 for receiving spools at the bottom of a tail gate, which has been removed, to prevent swinging of the same.

Designed for mounting on the rear portion of the dump truck body 10 in lieu of its normal tail gate is the spreader box attachment, which is the subject of this invention, the spreader box attachment being referred to in general by the reference numeral 24. The spreader box attachment 24 is adapted to be mounted at the rear of the dump truck body 10 for controlling the spreading of materials carried by the dump truck body.

The spreader box attachment includes a chute which is referred to in general by the reference numeral 26. The chute 26 includes a pair of outwardly and rearwardly diverging side walls 28 which are secured together in spaced relation by top and bottom walls 30 and 32, respectively. The top wall extends downwardly from the upper end of the chute 26 at a very sharp angle and is secured to the upper edges of the side walls 28. The bottom wall 32 extends between and is secured to the bottom edges of the side walls 28 so as to connect together the lower edges thereof. The bottom wall 32 also slopes downwardly, but at a lesser angle than the top wall 30, so as to facilitate the flow of materials through the chute 26. It will be noted that the forward and the rear edges of the side walls 28 are in vertical planes.

Figure 2:
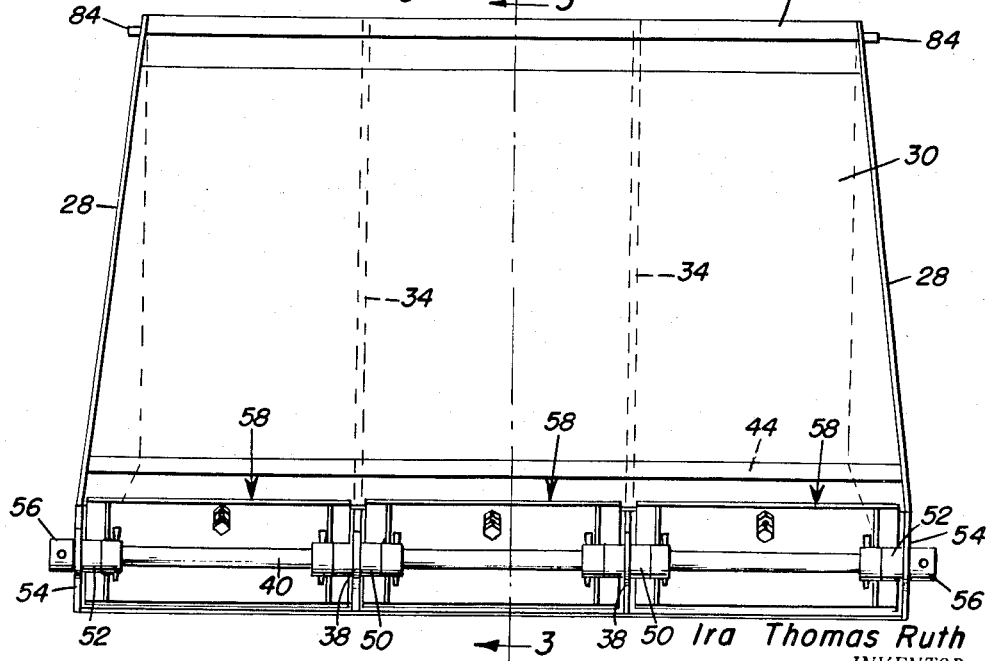
Figure 2 is a rear elevational view of the dump truck body of Figure 1 and shows the general configuration of the spreader box attachment.

Referring now to Figures 2 and 3 in particular, it will be seen that the top and bottom walls 30 and 32, respectively, are braced intermediate their ends by vertically extending bulkheads 34. The bulkheads 34 terminate above the lower rear ends of the top and bottom walls and are provided with recesses in their lower ends to permit transverse movement of materials, the recesses being referred to by the reference numeral 36. The bulkheads 34 are also provided with extensions 38 which are in spaced relation to their lower ends, but lie in the same vertical planes. The extensions 38 reinforce the upper and lower walls 30 and 32, respectively, adjacent their lower edges which are not connected to any element. The extensions 38 also extend rearwardly of the lower edges of the top and bottom walls to form mounting means for a transversely extending horizontal actuating shaft 40 of a gate structure which is referred to in general by the reference numeral 42.

In order that the various portions of the chute structure 26 may be prevented from twisting, the same is reinforced by a transversely extending angle member 44 secured to the upper surface of the top wall 30 at the lower edge thereof. The bottom wall 32 is also reinforced by a transverse angle member 46 which is secured to the lower surface thereof adjacent its forward edge. The top wall 30 is further braced by a transversely extending angle member 48 which is secured to the upper surface thereof adjacent its upper edge.

It will be noted that the gate structure 42 is disposed at the lower rear end of the chute structure 26 and that the same is adapted to close a discharge opening formed by the space between the lower rear edges of the upper and lower walls 30 and 32, respectively. A major element of the gate structure 42 is the transversely extending actuating shaft 40. As is best illustrated in Figure 5, the actuating shaft 40 is mounted for rotation in bearing members in the form of horizontal sleeves 50 carried by the outer ends of the extensions 38. The sleeves 50 support the actuating shaft 40 intermediate its ends and the same is supported in sleeves 52 at the outer ends thereof. The sleeves 52 are carried by rearwardly projecting extensions 54 of the side walls 28. The actuating shaft 40 is retained within the sleeves 50 and 52 by collars 56 secured on the outer ends thereof by suitable fastening means which may include welding.

Figure 4:
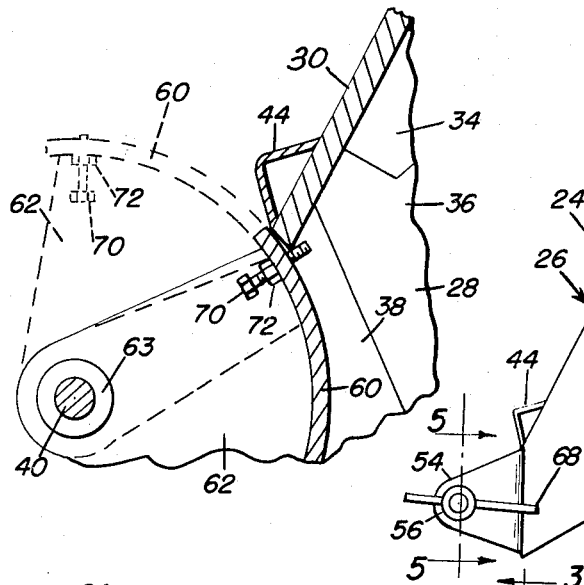
Figure 4 is an enlarged fragmentary vertical sectional view showing the arrangement of lock means for locking a section of said gate in a closed position, an open position of the gate section being shown in dotted lines.

Inasmuch as the extensions 38 extend rearwardly from between the rear edges of the top and bottom walls 30 and 32, respectively, it will be seen that the discharge opening which extends between the rear edges of these walls is divided into three discharge spaces of substantially equal size. Each of these discharge spaces is controlled by a gate section which is mounted on the actuating shaft 40 and is referred to in general by the reference numeral 58. Inasmuch as each of the gate sections 58 is identical, only one of the same will be described in detail. Referring now to Figures 4 and 5 in particular, it will be seen that each gate section 58 includes a curved transversely extending gate element 60 which is reinforced adjacent its ends by sector-shaped ribs 62. The ribs 62 have generally the same configuration as the extensions 54 and are provided with sleeves 63 through which the actuating shaft 40 is adapted to be passed. The sleeves are so spaced that they are adapted to substantially engage the sleeves carried by the extensions 38 and 54 so as to prevent movement of the gate sections 58 along the actuating shaft 40. The sleeves 63 and the actuating shaft 40 are provided with aligned tapered holes in which are driven tapered pins 64. The tapered pins 64 secure the gate sections 58 to the actuating shaft 40 for movement therewith. It will be noted that the gate element 60 is of a length whereby the same substantially engages the extensions 38 and 54 to prevent the flow of material between the same. The gate element 60 is also of such a size whereby the same may simultaneously engage the lower edges of both the top and bottom walls 30 and 32, respectively, to prevent flow of material above or below the same.

Referring now to Figure 5 in particular, it will be seen that at least one of the collars 56 is provided with bores 66 therethrough. The bores 66 also pass through the actuating shaft 40 and are at right angles to each other. Selectively positioned within one of the bores is an actuating rod 68 for rotating the actuating shaft 40 to move the gate sections 58 to opened positions. It will be seen that by rotating the actuating rod 68 the desired amount, the lower edges of the gate elements 60 may be rotated upwardly away from the bottom wall 32 whereby material within the dump truck body 10 may flow between the same.

While quite often it is desired to spread material the full width of a truck body, at times it is desirable to spread materials in a narrower strip than the width of the truck body. Inasmuch as sections of the discharge opening of the chute structure 26 are individually closable by the gate sections 58, it will be seen that by removing the tapered pins 64 of certain of the gate sections the effective width of the material being spread may be varied.

Referring now to Figure 5 in particular, it will be seen that positioned adjacent the upper edge of the gate element 60 intermediate its ends is a latch bolt 70. The latch bolt 70 is threadedly engaged within the bore through the gate element 60 and is adapted to extend within the discharge opening. The latch bolt 70 has threadedly engaged thereon a locking nut 72 for retaining the same in an adjusted position. When the gate element 60 is to be rotated together with the actuating shaft 40, the latch element 70 is retracted to clear the lower edge of the top wall 30. However, should it be desired to spread material in a narrow strip and it is not necessary to open one of the gate sections 58, the same may be held in a closed position while the other is open by removing the tapered pins 64. The latch bolt 70 is then screwed to the position illustrated in Figure 4 so as to prevent rotation of the gate section with the actuating shaft 40 due to frictional engagement of the sleeves 62 with the actuating shaft 40.

Referring now to Figure 1 in particular, it will be seen that secured to the upper front portions of the side walls 28 on the outer surfaces thereof are L-shaped hangers which are referred to in general by the reference numeral 74. The hangers 74 include vertical legs 76 which are secured to the side walls 28 by suitable fasteners 78. The fasteners 78 pass through elongated slots 80 in the vertical legs 76 so as to permit the vertical adjustment of horizontal legs 82 of the hanger. The horizontal legs extend forwardly from the upper ends of the vertical legs 76 and are positioned adjacent the hinge plates 20. The horizontal legs 82 are hingedly connected to the hinge plates 20 by a transversely extending hinge pin 84.

Referring now to Figures 1 and 6 in particular, it will be seen that secured to the side walls 28 adjacent their lower forward edges are supporting brackets 86. Each supporting bracket 86, whose configuration is best illustrated in Figure 6, includes a horizontal flange 88 which is secured to the lower surface of the bottom wall 32. Integral with the horizontal flange 88 is an inner vertical leg 90 of a lower U-shaped portion. The lower U-shaped portion also includes a leg 92 and a second vertical leg 94, the vertical legs 90 and 94 being in spaced parallel relation. Extending between and secured to the vertical legs 90 and 94 is a horizontal spool 96. The spool 96 is adapted to be releasably clamped in one of the latch members 22 for securing the lower forward edge of the chute attachment 26 to the rear of the dump truck body 10.

In order that the support bracket 86 may be braced against twisting, the same is provided with a rearwardly and inwardly extending brace 98 which has a forward end secured to the upper end of the vertical leg 94 and a rear end which is secured to the outer surface of an associated side wall 28.

Not only does the spreader box attachment 24 permit the spreading of a wide variety of materials in various widths, the same is so constructed whereby the materials may be spread on an oily surface by backing the truck up during the spreading operation. Also, the spreader box attachment may be utilized in the same manner as a tail gate by disregarding the spreading feature.

The operation of this device will be understood from the foregoing description of the details thereof, taken in connection with the above recited objects and drawings. Further description would appear to be unnecessary.

Minor modifications of the device, varying in minor details from the embodiment of the device illustrated and described here, may be resorted to without departure from the spirit and scope of this invention, as defined in the appended claims.

Having thus described the invention, what is claimed as new is:

1. A spreader box tail gate attachment comprising a chute-like structure attachable to the rear of a truck body, said chute-like structure having a discharge opening at its rear end, gate means for selectively closing said discharge opening, said gate means including a transverse actuating shaft, gate sections mounted on said actuating shaft, removable securing means securing each of said gate sections to said actuating shaft for rotation therewith, lock means by said gate sections and being selectively engaged with said chute-like structure for selectively preventing rotation of said gate sections.

2. A spreader box tail gate attachment comprising a chute-like structure attachable to the rear of a truck body, said chute-like structure having a discharge opening at its rear end, gate means for selectively closing said discharge opening, said gate means including a transverse actuating shaft, gate sections mounted on said actuating shaft, removable securing means securing each of said gate sections to said actuating shaft for rotation therewith, each of said gate sections having carried thereby latch means structurally engaged with said chute-like structure for selectively preventing rotation of said gate sections with said actuating shaft.

3. A spreader box tail gate attachment comprising a chute-like structure attachable to the rear of a truck body, said chute-like structure having a discharge opening at its rear end, gate means for selectively closing said discharge opening, said gate means including a transverse actuating shaft, gate sections mounted on said actuating shaft, removable securing means securing each of said gate sections to said actuating shaft for rotation therewith, lock means for selectively preventing rotation of said gate sections, said chute-like structure including a top wall, said lock means including a member adjustably projectable from each gate section and engageable with a rear edge of said top wall.

References Cited in the file of this patent

UNITED STATES PATENTS

| | | |
|---|---|---|
| 1,220,945 | Brown | Mar. 27, 1917 |
| 1,823,935 | George | Sept. 22, 1931 |
| 2,005,896 | Hurt | June 25, 1935 |
| 2,265,802 | Cox | Dec. 9, 1941 |
| 2,323,345 | Moore | July 6, 1943 |

FOREIGN PATENTS

| | | |
|---|---|---|
| 203,746 | Great Britain | Sept. 17, 1923 |